US 9,463,377 B2

(12) United States Patent
Pennacchio (10) Patent No.: US 9,463,377 B2
(45) Date of Patent: Oct. 11, 2016

(54) REAL-TIME AND NEAR-REAL-TIME FANTASY GAMING

(71) Applicant: Joseph Pennacchio, Itasca, IL (US)

(72) Inventor: Joseph Pennacchio, Itasca, IL (US)

( * ) Notice: Subject to any disclaimer, the term of this patent is extended or adjusted under 35 U.S.C. 154(b) by 92 days.

(21) Appl. No.: 14/250,626

(22) Filed: Apr. 11, 2014

(65) Prior Publication Data

US 2015/0290537 A1 Oct. 15, 2015

(51) Int. Cl.
*G07F 17/32* (2006.01)
*A63F 13/00* (2014.01)

(52) U.S. Cl.
CPC ..................... *A63F 13/00* (2013.01)

(58) Field of Classification Search
CPC ....................................... G07F 17/32
See application file for complete search history.

(56) References Cited

U.S. PATENT DOCUMENTS

| | | | | |
|---|---|---|---|---|
| 2008/0274782 A1* | 11/2008 | Schmidt | .................. | A63F 13/12 463/13 |
| 2009/0069089 A1* | 3/2009 | Piccioni | .............. | G07F 17/3279 463/42 |
| 2009/0170604 A1* | 7/2009 | Mueller | .................. | A63F 13/12 463/42 |

OTHER PUBLICATIONS

Wikipedia, "Daily Fantasy Sports," http://en.wikipedia.org/wiki/Daily_Fantasy_Sports, Apr. 6, 2014, 2 pages.
Wikipedia, "Fantasy sport," http://en.wikipedia.org/wiki/Fantasy_sport, Apr. 6, 2014, 11 pages.

* cited by examiner

*Primary Examiner* — Omkar Deodhar
(74) *Attorney, Agent, or Firm* — McDonnell Boehnen Hulbert & Berghoff LLP (57) ABSTRACT

Player predictions may be received from one or more player devices. The player predictions may relate to an epoch of a contemporaneously-occurring, real-time gaming event, and may be received within a first time period. After receiving the player predictions, one or more referee reports may be received from referee devices. The referee reports may include assessed outcomes of the epoch of the contemporaneously-occurring, real-time gaming event, and may be received within a second time period. Based on the player predictions and the referee reports, player accuracies of the player predictions and player rankings of the player devices may be determined. Representations of the player accuracies and the player rankings may be transmitted to the player devices.

19 Claims, 8 Drawing Sheets

REAL-TIME AND NEAR-REAL-TIME FANTASY GAMING

BACKGROUND

Fantasy gaming is growing in popularity worldwide. Initially focused on major sports, such as baseball and American football, fantasy gaming allows human players to select a representation of real-world athletes to participate in a season-long simulated campaign, alone or against other players. For instance, with such a selected team, a fantasy game player's performance may be based on how each athlete on the player's selected team performs in real-world sporting events (e.g., using the athletes' real-world statistics).

Fantasy gaming has crossed over into many sports and other types of gaming as well, and has incorporated elements of wagering. Thus, players might be required to pay an entrance fee to join a fantasy league. If a player in such a league performs well, however, that player might be rewarded with a payout greater than his or her entrance fee.

Further, daily fantasy gaming is a recent trend that allows players to select different athletes for fantasy teams each day (or, in the cases of some sports, each weekend or week), with associated daily (or weekly) wagering. In this way, players are more engaged with their fantasy games, as they may spend a portion of each day selecting players, strategies, and wagers.

SUMMARY

While daily fantasy gaming may enhance the degree of player excitement and involvement when compared to traditional season-long fantasy gaming, players may be even further excited and engaged when the fantasy game can be played on a more granular basis. This basis may be a discrete play, a period of real-world game time, or some other epoch.

For instance, in the example of American football, each play of the real-world game can be a discrete fantasy game event. While the real-world game is occurring contemporaneously, players of the fantasy game may select the play that they think the offensive team is going to perform, the athlete or athletes who will be involved in the play, and the yardage of the play. As examples, selectable plays may include passing plays, running plays, or kicking plays. Selectable players may include the quarterback, who decides to whom the football is intended to go, and the recipient of the football. The yardage may be selected as a range, e.g., 0-4 yards, 5-10 yards, 11-20 yards, more than 20 yards, negative yardage, and so on. Players may be rewarded based on the accuracy of their selections compared to the actual, real-world outcome of the play. A combination of one or more of these selectable factors may be referred to as the player's prediction.

This form of real-time or near-real-time fantasy gaming may require that the players enter their predictions within a specific window of time for each play. In American football, this period of time may be from when the whistle blows on the most recent play until the football is snapped on the next play. Longer or shorter periods of time may be used in some situations. Players who enter their predictions within this period of time may be considered participants for the next play.

After the next play occurs (e.g., the whistle is blown), each player's prediction may be compared to the actual, real-world outcome of the play in order to determine how to reward each player. For instance, the more closely a particular player's prediction matches the outcome of the play, the more points might be rewarded to the particular player. Player rankings may also be updated so that players can compare their prediction accuracy to that of other players.

A challenge for real-time and near-real-time fantasy gaming is to provide the refereed assessments of the outcome each play quickly enough so that the players' rankings and/or scores are updated rapidly after each play (e.g., within a few seconds or tens of seconds). Some commercial, electronic statistics feeder services exist, but these services may take as long as a minute to provide such information. In that period of time, several plays of the real-world game could occur, which would result in the players' rankings and/or scores being unsynchronized with the real-world game. This would possibly decrease the viability of fantasy game.

Among other advantages, the embodiments herein overcome these limitations by allowing one or more human referees to provide assessments of each play. These referees may have, for example, from the time when the most recent play ends until the next play begins to enter their assessments of the most recent play. The referees may select the play that the offensive team performed, the athlete or athletes who were involved in the play, the yardage of the play, and/or possibly other characteristics of the play.

In order to account for possible human error, the assessments of more than one referee may be considered, and a voting protocol may be used to determine which assessments to use when not all referees agree on the outcome of the play. Additionally, the accuracy of each referee's assessments may also be measured over time, and may be taken into consideration in the voting protocol. For instance, assessments from a referee with a 98% accuracy rating may be given more weight than assessments from a referee with a 91% accuracy rating.

The players and/or referees may interact with one another via one or more computer networks. Thus, in some cases, players and/or referees may use computing devices to engage in real-time or near-real-time fantasy gaming from their homes or any other location. One or more server devices may maintain player and referee accounts, receive player predictions and referee assessments, update player and referee rankings, and otherwise mediate the real-time or near-real-time fantasy game.

Accordingly, in a first example embodiment, player predictions may be received from one or more player devices. The player predictions may relate to an epoch of a contemporaneously-occurring, real-time gaming event, and may be received within a first time period. After receiving the player predictions, one or more referee reports may be received from referee devices. The referee reports may include assessed outcomes of the epoch of the contemporaneously-occurring, real-time gaming event, and may be received within a second time period. Based on the player predictions and the referee reports, player accuracies of the player predictions and player rankings of the player devices may be determined. Representations of the player accuracies and the player rankings may be transmitted to the player devices.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Figure 1:
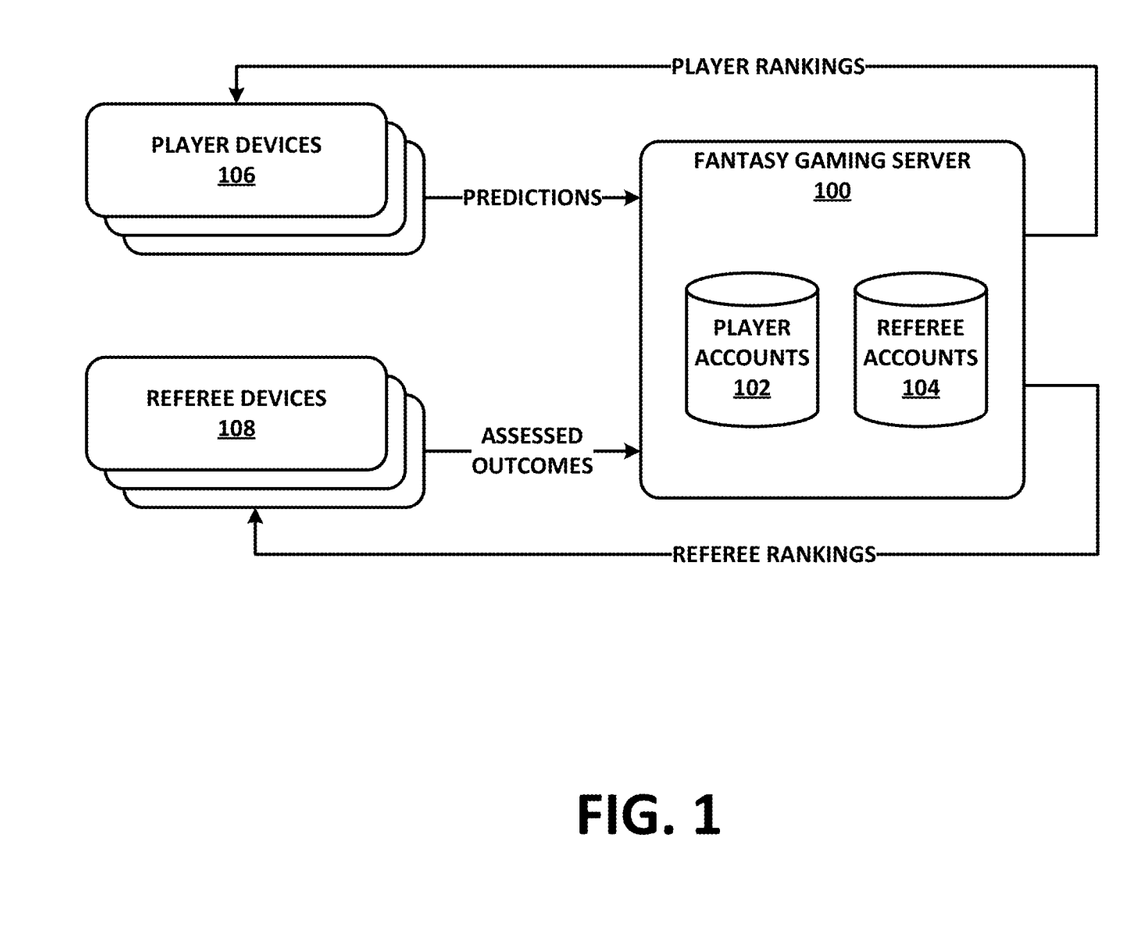
FIG. 1 is a high-level depiction of a computing system that supports real-time and near-real-time fantasy gaming, according to an example embodiment.

FIG. 1 is a high-level depiction of a computing system that supports real-time and near-real-time fantasy gaming. The distinction between the terms "real-time" and "near-real-time" as used herein is a matter of degree. For instance, "real-time" and "near-real-time" fantasy gaming may result in the players of the fantasy game obtaining a refereed assessment of the previous play of a real-world game within a particular time period, or prior to the next play of the real-world game being started or completed. In general, "real-time" fantasy gaming may provide these assessments more rapidly than "near-real-time" fantasy gaming. However, the term "near-real-time" may be used to reflect that assessments may be received after delays due to human data entry, computer processing of these entries, and/or communication delays associated with transmitting representations of the assessments (and possibly other information) to the players.

Regardless, fantasy gaming server 100 may facilitate online access from one or more player devices 106 and one or more referee devices 108. Each of fantasy gaming server 100, player devices 106, and referee devices 108 may be a computing device, and these computing devices may be interconnected by a computer network, such as the Internet or one or more private networks.

Each of player devices 106 may correspond to a human player of the fantasy game, and each of referee devices 108 may correspond to a human or automated referee for the fantasy game. However, other arrangements are possible, such as two or more human players sharing the same player device, two or more referees sharing the same referee device, and so on.

Further, the human players and any human referees may observe the real-world game in real-time, either in person, via television, via network streaming, or via some other mechanism. Thus, the real-world game and the fantasy game need not be interconnected or formally associated with one another. For example, the real-world game may be operated by a sports organization, and the fantasy game may be operated by a gaming organization that is distinct and separate from the sport organization.

Alternatively, the fantasy game and the real-world game may be interconnected in some fashion. For instance, representations of live or historical player predictions may be provided to the television feed or scoreboard of the real-world game, and these predictions may be displayed before, during, or after plays of the real-world game. Similarly, representations of historical play outcomes may be provided to the television feed or scoreboard of the real-world game, and these outcomes may be displayed before, during, or after plays of the real-world game. Alternatively or additionally, representations of referee assessments may be provided to the television feed or scoreboard of the real-world game, and these assessments may be displayed before, during, or after plays of the real-world game.

Player accounts 102 may be a database and/or some other organization of information that represents attributes of one or more players of fantasy games supported by fantasy gaming server 100. Thus, for each player, player accounts 102 may include a username, email address, physical address, phone number, monetary balance, and/or billing information. Player accounts 102 may also include representations of scores, statistics, and/or rankings related to the players' participation in fantasy games supported by fantasy gaming server 100.

Similarly, referee accounts 104 may be a database and/or some other organization of information that represents attributes of one or more referees of fantasy games supported by fantasy gaming server 100. Thus, for each referee, referee accounts 104 may include a username, email address, physical address, phone number, monetary balance, and/or billing information. Referee accounts 104 may also include representations of scores, statistics, and/or rankings related to the referees' participation in fantasy games supported by fantasy gaming server 100.

FIG. 1 also illustrates an example of the general information flow between the components of fantasy gaming server 100, player devices 106, and referee devices 108.

Player devices 106 may provide predictions to fantasy gaming server 100. Representation of these predictions may be stored in player accounts 102. Referee devices 108 may provide assessed outcomes to fantasy gaming server 100. Representation of these predictions may be stored in referee accounts 104. After the relevant assessed outcomes are received for a given play of a real-world game, fantasy gaming server 100 may determine, based on the assessed outcomes, a refereed outcome of the play. Fantasy gaming server 100 may also determine accuracies of the players' predictions based on how closely these predictions match the refereed outcome, and update player accounts accordingly. Fantasy gaming server 100 may further transmit updated player rankings to player devices 106. These rankings may include some form of score, standings, or winnings associated with the players.

Additionally, fantasy gaming server 100 may evaluate the accuracy of each referee's assessment outcome, and may update referee accounts 104 accordingly. Fantasy gaming server 100 may further transmit updated referee rankings to referee devices 108. These rankings may include some form of score, standings, or winnings associated with the referee. For instance, each referee may be associated with a referee accuracy, between 0% and 100%, that represents the historical accuracy of the referees' assessed outcomes.

It should be understood that fantasy gaming server 100, player accounts 102, referee accounts 104, as well as any other function associated with the architecture of FIG. 1, can be operated on or by one or more computing devices. These computing devices may be organized in a standalone fashion, in cloud-based (networked) computing environments, or in other arrangements. Examples are provided in the next section.

2. Example Computing Devices and Cloud-Based Computing Environments

Figure 2:
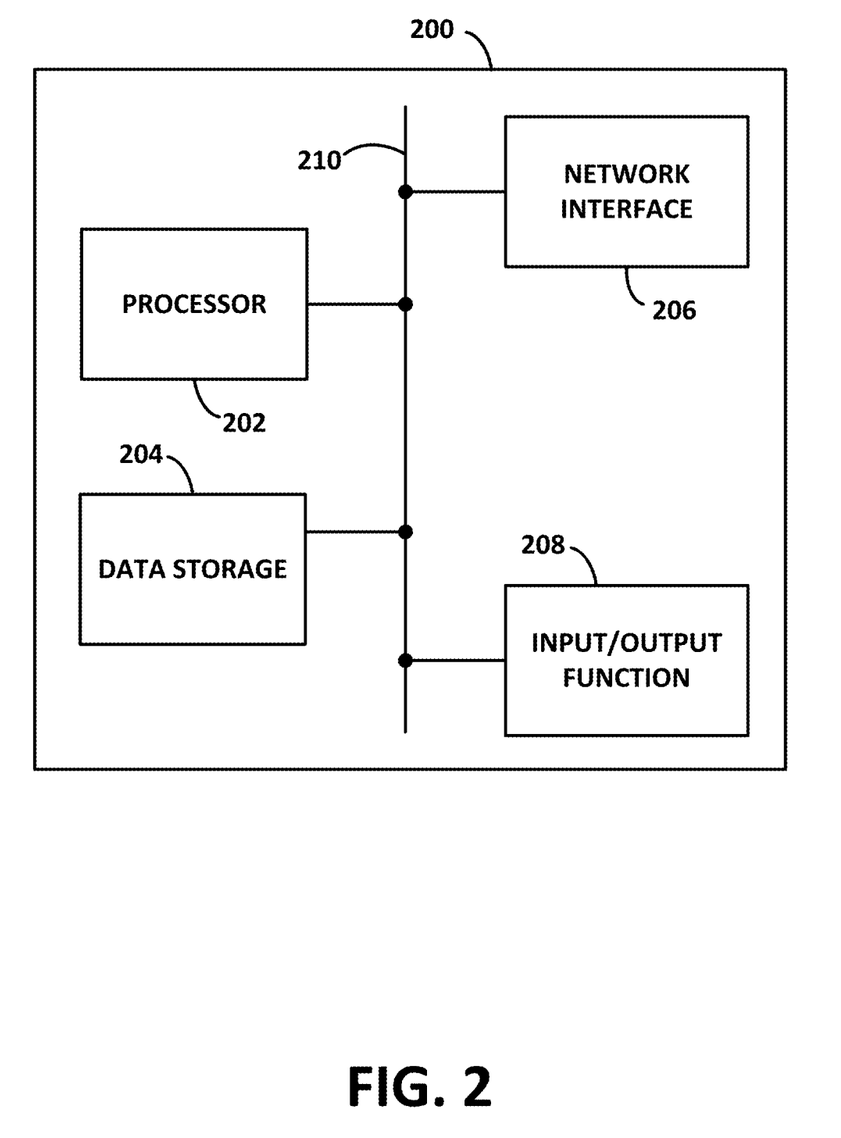
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a personal computer (PC), laptop, server, or some other type of computational platform. For purposes of simplicity, this specification may equate computing device 200 to a server from time to time, and may also refer to some or all of the components of computing device 200 as a "processing unit." Nonetheless, it should be understood that the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
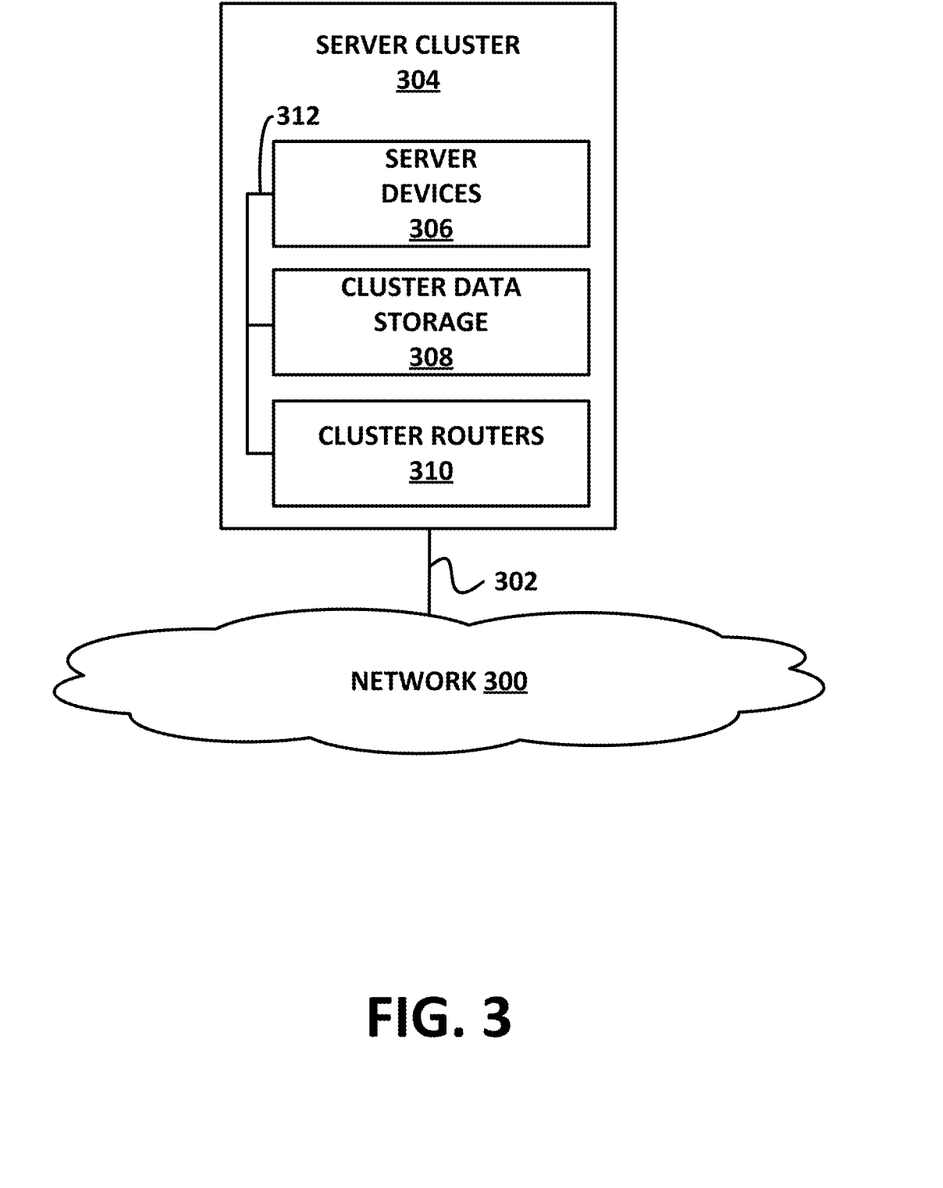
FIG. 3 illustrates a schematic drawing of a networked server cluster, according to an example embodiment.

FIG. 3 depicts a cloud-based server cluster 304 in accordance with an example embodiment. In FIG. 3, functions of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

3. Example American Football Embodiments a. Example Player User Interface

Figure 4A:
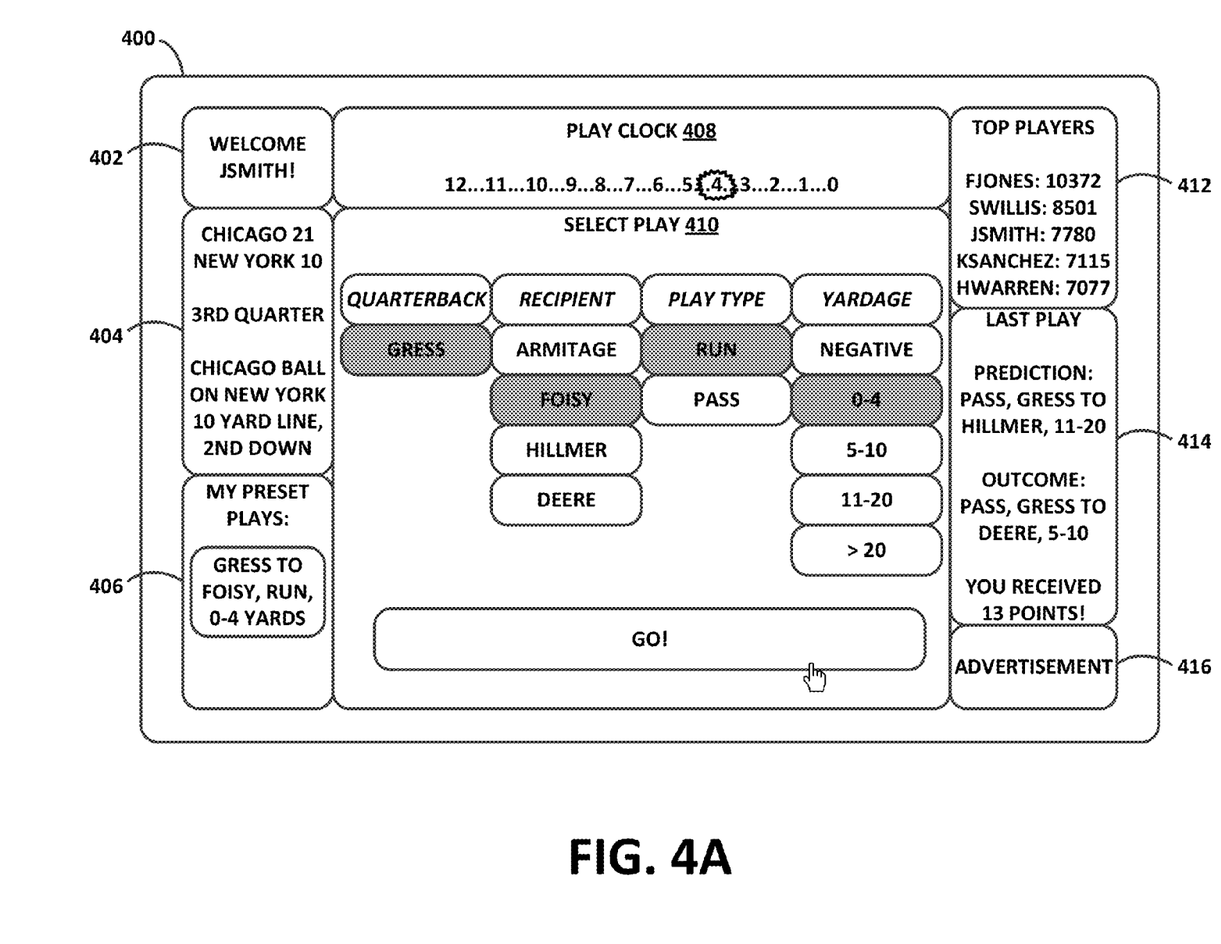
FIG. 4A depicts an example player user interface for American football, according to an example embodiment.

FIG. 4A an example player user interface 400 for real-time or near-real-time fantasy gaming. Player user interface 400 includes a left column, a central column, and a right column. The left column includes welcome section 402, real-world game identification section 404, and preset plays section 406. The central column includes play clock section 408 and play selection section 410. The right column includes top players section 412, last play section 414, and advertisement section 416.

Player user interface 400 is an example of a player user interface for American football. However, other user interface layouts for American football may be used, and player user interface 400 is just one possible example. For instance, more or fewer sections may be used, and sections may appear in different locations from those depicted in FIG. 4A. Additionally, user interface layouts for other real-world games may be possible. Player user interface 400 may be a web-based user interface, assessable via a personal computer, tablet device, smartphone device, or some other types of computing device. Alternatively or additionally player user interface 400 may be part of an application or "app" that operates on such a device.

Welcome section 402 may identify a userid of a player. In the case of FIG. 4A, the player's userid is JSMITH. Real-world game identification section 404 identifies the real-world American football game to which player user interface 400 refers. This example real-world game is in the third quarter, and the Chicago team is beating the New York team 21 to 10. The Chicago team possesses the ball (i.e., is the offensive team) on the 10 yard line of the New York team on second down.

Play clock 408 may be a count-down or count-up clock that represents the amount of time remaining that the player has to make his or her prediction for the next play. For example, play clock 408 represents a 12-second countdown clock that indicates that 4 seconds remain. Thus, JSMITH has 4 seconds in which to make and enter selections in play selection section 410. It should be understood that play clock 408 may be represented in various other ways.

Play selection section 410 allows the player to select a combination of quarterback, recipient, play type, and yardage for the next play. The quarterback may be the player who throws or passes the football to the recipient. Thus, the recipient may be a pass receiver or a runner. The type of play may be a run or a pass, and the yardage may be negative, from 0-4 yards, from 5-10 yards, from 11-20 yards, or greater than 20 yards. In the example illustrated by FIG. 4A, the player has selected a running play from quarterback Gress to recipient Foisy for 0-4 yards. This play will be entered (i.e., transmitted to the fantasy gaming server) when the player triggers the "GO!" button. In some cases, the "GO!" button will be omitted and the player's selections will be automatically submitted when play clock 408 expires.

Play selection section 410 depicts just one possible example. Other arrangements may be possible. These alternative arrangements may include, but are not limited to, more or fewer quarterbacks, recipients, play types (e.g., punts, field goals, etc.), and extents of yardage. Also, other selectable items may be presented to the player, such as whether the play results in a touchdown or a penalty.

Preset plays section 406 includes one preset play for JSMITH. In some embodiments, preset plays include one or more pre-selected combinations of quarterback, recipient, play type, and yardage. Preset plays may be defined to be specific to particular quarters, downs, ball position, and so on. For instance, in the example depicted in FIG. 4A, the player has one preset play—a run from quarterback Gress to recipient Foisy for 0-4 yards. Preset plays may allow players to specify common plays that teams are likely to perform. Thus, preset plays could allow players to more rapidly enter their predictions. Alternatively, preset plays may be configured to automatically be entered on behalf of a player based on certain triggers (e.g., down, ball position, athletes on the field, etc.). Thus, the player may be able to program the fantasy game to automatically enter a series of one or more preset plays based on these triggers.

Top players section 412 may include a list of players with the highest n rankings in the fantasy gaming league. For example, in FIG. 4A, player FJONES has the highest ranking, with 10372 points, followed by SWILLIS with 8501 points, JSMITH with 7780 points, KSANCHEZ with 7115 points, and HWARREN with 7077 points. In this case, players with the highest 5 rankings are shown, but more or fewer player rankings may be displayed. Also, a fantasy gaming league may encompass all fantasy gaming players, or some subset thereof. For example, a group of individuals may form their own fantasy gaming league and therefore may be ranked against each other accordingly.

Last play section 414 may include a representation of the player's prediction for the previous play of the real-world game, as well as a representation of the actual outcome of the play and/or an indication of an adjustment to the player's score or ranking due to the accuracy of his or her prediction. For example, in FIG. 4A, JSMITH predicted that the last play would involve quarterback Gress passing to recipient Hillmer for 11-20 yards. In reality, the play involved quarterback Gress passing to recipient Deere for 5-10 yards. Since JSMITH correctly predicted some, but not all, aspects of the play, last play section 414 shows that JSMITH was awarded 13 points.

In one possible example, if JSMITH had more correctly predicted the outcome of the play, JSMITH may have been award more points. However, if JSMITH had not correctly predicted any aspects of the play, JSMITH may not receive any points or may lose points. Other scoring mechanisms may be used as well.

Advertisement section 416 may include one or more advertisements. These advertisements may be for products or services related to the fantasy gaming system itself and/or for other products or services. Providing advertising may facilitate an additional source of revenue for the provider of the fantasy gaming system.

Each section of player user interface 400 may include zero or more selectable items. For instance, selecting part of preset plays section 406 (e.g., via a keyboard, mouse, or touchscreen) may prompt the player to add, edit, or delete preset plays. In another example, selecting various aspects of a play in play selection section 410 may involve these aspects being highlighted, and triggering the "GO!" button in this section may result in the selected aspects being submitted as the player's prediction. In still another example, selecting a player userid from top players section 412 may result in further information regarding the selected player (e.g., a public profile of the player) being displayed. In yet another example, players may be able to enter wagers associated with their performance in the fantasy game, on a play-by-play or group-of-plays basis, and may be credited or penalized according to the accuracy of their predictions. In an additional example, the fantasy game may record whether a player is having a streak of correct predictions, and may provide a bonus to the player's awarded points based on the extent of the streak. Other features are possible as well.

b. Example Referee User Interface

Figure 4B:
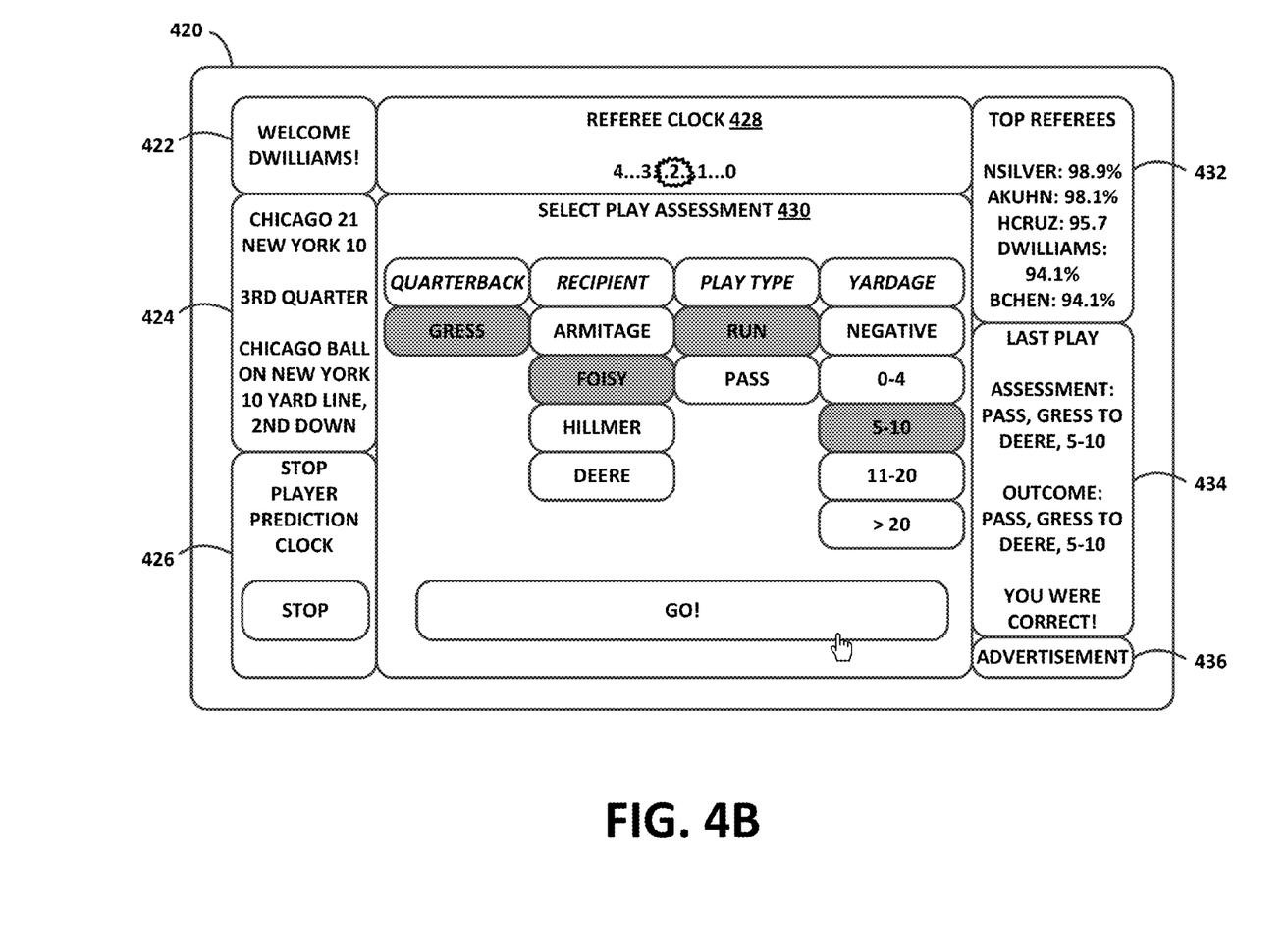
FIG. 4B depicts an example referee user interface for American football, according to an example embodiment.

FIG. 4B an example referee user interface 420 for real-time or near-real-time fantasy gaming. Referee user interface 420 includes a left column, a central column, and a right column. The left column includes welcome section 422, real-world game identification section 424, and stop player prediction clock section 426. The central column includes referee clock section 428 and play assessment selection section 430. The right column includes top referees section 432, last play section 434, and advertisement section 436.

Referee user interface 420 is an example of a referee user interface for American football. However, other user interface layouts for American football may be used, and referee user interface 420 is just one possible example. For instance, more or fewer sections may be used, and sections may appear in different locations from those depicted in FIG. 4B. Additionally, user interface layouts for other real-world games may be possible. Referee user interface 420 may be a web-based user interface, assessable via a personal computer, tablet device, smartphone device, or some other types of computing device. Alternatively or additionally referee user interface 420 may be part of an application or "app" that operates on such a device.

Welcome section 422 may identify a userid of a referee. In the case of FIG. 4B, the referee's userid is DWILLIAMS. Real-world game identification section 424 identifies the real-world American football game to which referee user interface 420 refers. This example real-world game is in the third quarter, and the Chicago team is beating the New York team 21 to 10. The Chicago team possesses the ball (i.e., is the offensive team) on the 10 yard line of the New York team on second down.

Referee clock 428 may be a count-down or count-up clock that represents the amount of time remaining that the referee has to make his or her assessment for the previous play. For example, referee clock 428 represents a 4-second countdown clock that indicates that 2 seconds remain. Thus, DWILLIAMS has 2 seconds in which to make and enter selections in play assessment selection section 430. It should be understood that referee clock 428 may be represented in various other ways.

Play assessment selection section 430 allows the referee to select a combination of quarterback, recipient, play type, and yardage for the previous play. These parameters may have the same meaning as those in select play section 410 of FIG. 4A. In the example illustrated by FIG. 4B, the referee has selected a running play from quarterback Gress to recipient Foisy for 5 to 10 yards. This play assessment will be entered (i.e., transmitted to the fantasy gaming server) when the referee triggers the "GO!" button.

Play assessment selection section 430 depicts just one possible example. Other arrangements may be possible. These alternative arrangements may include, but are not limited to, more or fewer quarterbacks, recipients, play types (e.g., field goal, punt, etc.), and extents of yardage. Also, other selectable items may be presented to the referee, such as whether the play resulted in a touchdown or a penalty.

Stop player prediction clock section 426 includes a "STOP" button that allows DWILLIAMS to indicate that the player prediction clock (e.g., play clock 408) should be stopped. In some embodiments, a referee may only activate this button after all players involved in the fantasy game have entered their predictions for the next play. Stopping the player prediction clock could indicate to the fantasy gaming server that it no longer needs to wait for player predictions for this play. Thus, the "STOP" button may be grayed out until all players have entered their predictions, and then it may be made available.

Top referees section 432 may include a list of referees with the highest n accuracies in the fantasy gaming league. For example, in FIG. 4B, referee NSILVER has the highest accuracy of 98.9%, followed by AKUHN with a 98.1% accuracy, HCRUZ with a 95.7% accuracy, DWILLIAMS with a 94.1% accuracy, and BCHEN also with a 94.1% accuracy. In this case, referees with the highest 5 accuracies are shown, but more or fewer referee accuracies may be displayed.

Referee accuracies may represent the number the referee's accuracy predictions divided by the total number of predictions that the referee has made for a given time period. Thus, referee accuracies may take on values from 0% to 100%. In general, the higher a referee accuracy ranking, the more reliable the referee's assessments have been.

Referees may seek to have a high referee accuracy ranking in order to increase their prestige amongst other referees and players of the fantasy game. Further, referees with the top accuracy rankings may be selected to be involved in more important fantasy games. For example, in championship and/or playoff games, only top referees may be invited. Additionally, referees may be compensated for refereeing a fantasy game, and the level of compensation may increase with the importance of the real-world game with which the fantasy game is associated.

Last play section 434 may include a representation of the referee's assessment for the previous play of the real-world game (e.g., the play prior to the play currently being assessed), as well as a representation of the actual outcome of the play and/or an indication of whether the referee's assessment was correct. For example, in FIG. 4B, DWILLIAMS predicted that the last play would involve quarterback Gress passing to recipient Deere for 5-10 yards, which was correct.

Advertisement section 436 may include one or more advertisements. These advertisements may be for products or services related to the fantasy gaming system itself and/or for other products or services. Providing advertising may facilitate an additional source of revenue for the provider of the fantasy gaming system.

Each section of referee user interface 420 may include zero or more selectable items. For instance, selecting various aspects of a play in play assessment selection section 430 may involve these aspects being highlighted, and selecting the "GO!" button in this section may result in the selected aspects being submitted as the referee's assessment. In still another example, selecting a referee userid from top referees section 432 may result in further information regarding the selected referee (e.g., a public profile of the referee) being displayed. Other features are possible as well.

Although not shown in FIG. 4B, referee user interface may have additional functionality. For example, one or more referees may have the ability to, via referee user interface 420, control what is displayed in real-world game identification section 404 and real-world game identification section 424. These referees may update the information displayed in those sections during each play, after each play, and/or as warranted.

Further, one referee per game may be a designated head referee. This may be the referee with the highest referee accuracy ranking of all referees refereeing the fantasy game, or may be some other referee. The head referee may have the ability to, via referee user interface 420, invalidate a recently-completed play. For instance, if there was a flag (e.g., a penalty flag or a challenge flag) thrown on a play in the real-world game, or if there was some other form of abnormality associated with a play, the head referee may invalidate the play. This would result in all player predictions and referee assessments of the play being ignored and/or disregarded for purposes of player and/or referee points, accuracies and/or rankings Thus, it may be possible that these points, accuracies and/or rankings are reset to their values prior to the invalidated play of the real-world game.

c. Example Timing Diagram

Figure 4C:
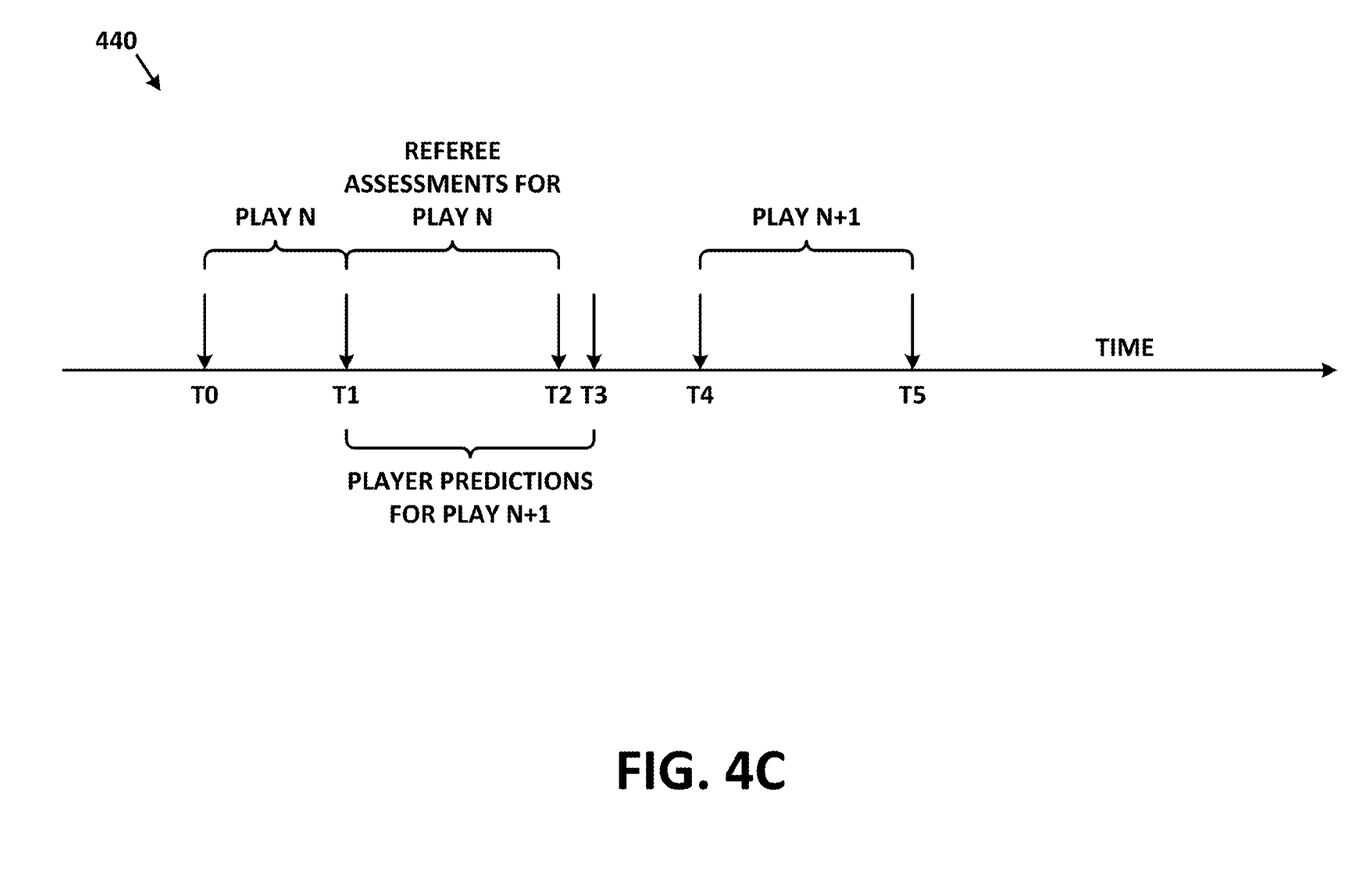
FIG. 4C depicts an example timing diagram, according to an example embodiment.

FIG. 4C is an example timing diagram 440 in accordance with a possible embodiment. Timing diagram 440 illustrates the temporal relationships between sequential plays of a real-world game and when player predictions and referee assessments for these plays may be received by the fantasy gaming server in order for these predictions and assessments to be considered.

In timing diagram 440, play N of the real-world game occurs from the epoch of time T0 to time T1. This first epoch may be anywhere from less than a second to several minutes or more. Similarly, play N+1 of the real-world game occurs from the epoch of time T4 to time T5. This second epoch also may be anywhere from less than a second to several minutes or more. In the case of American football, each epoch may typically be several seconds. Play N+1 may be the next play of the real-world game that follows play N.

As an example, time T0 may represent the time when the ball is snapped on play N, and time T1 may represent the time when the whistle blows on play N. Similarly, time T4 may represent the time when the ball is snapped on play N+1, and time T5 may represent the time when the whistle blows on play N+1.

From time T1 to time T2 may be a time period in which referee assessments for play N must be received from referees of the fantasy game in order for these assessments to be included in the refereed outcome of play N. Thus, any referee assessments for play N that arrive outside of the epoch of time T1 to time T2 may be ignored for purposes of determining the refereed outcome of play N.

From time T1 to time T3 may be a time period in which player predictions for play N+1 must be received from players of the fantasy game in order for these predictions to be considered for play N+1. Thus, any player predictions for play N+1 that arrive outside of the epoch of time T1 to time T3 may be ignored for purposes of determining player accuracies or player rankings.

In some embodiments, received player predictions may only be considered after time T2. For instance, referee assessments may be received and a referee may instruct the fantasy gaming serve to start play clock 408. In this case, any player predictions for play N+1 that arrive outside of the epoch of time T2 to time T3 may be ignored for purposes of determining player accuracies or player rankings.

4. Embodiments for Other Sports and Types of Games or Contests

The embodiments described herein may be applied to other sports, games, or contests. In particular, a fantasy game could be based on the examples of timing diagram of FIG. 4C, the voting protocol of FIG. 5, and/or the procedures of FIG. 6.

Thus, for instance, fantasy games for the real-world sports of baseball, basketball, hockey, soccer, golf, and so on could be conducted. Each "play" may be some form of offense, defensive, combination of athletes on the field or court in the real-world game, or a duration of time in the real-world game. Other types of real-world games may include video games, card games, reality-show contests, and so on.

Prior to commencement of the play, one or more players of the fantasy game may be able to enter their predictions of the outcome of the play. After the play completes, one or more referees may be able to enter their assessments of the play. Based on the referees' assessments, a refereed outcome of the play may be determined, and the players' prediction accuracies and rankings may be updated accordingly. Also, the referees' accuracies and rankings may be updated as well.

5. Example Voting Protocol

Figure 5:
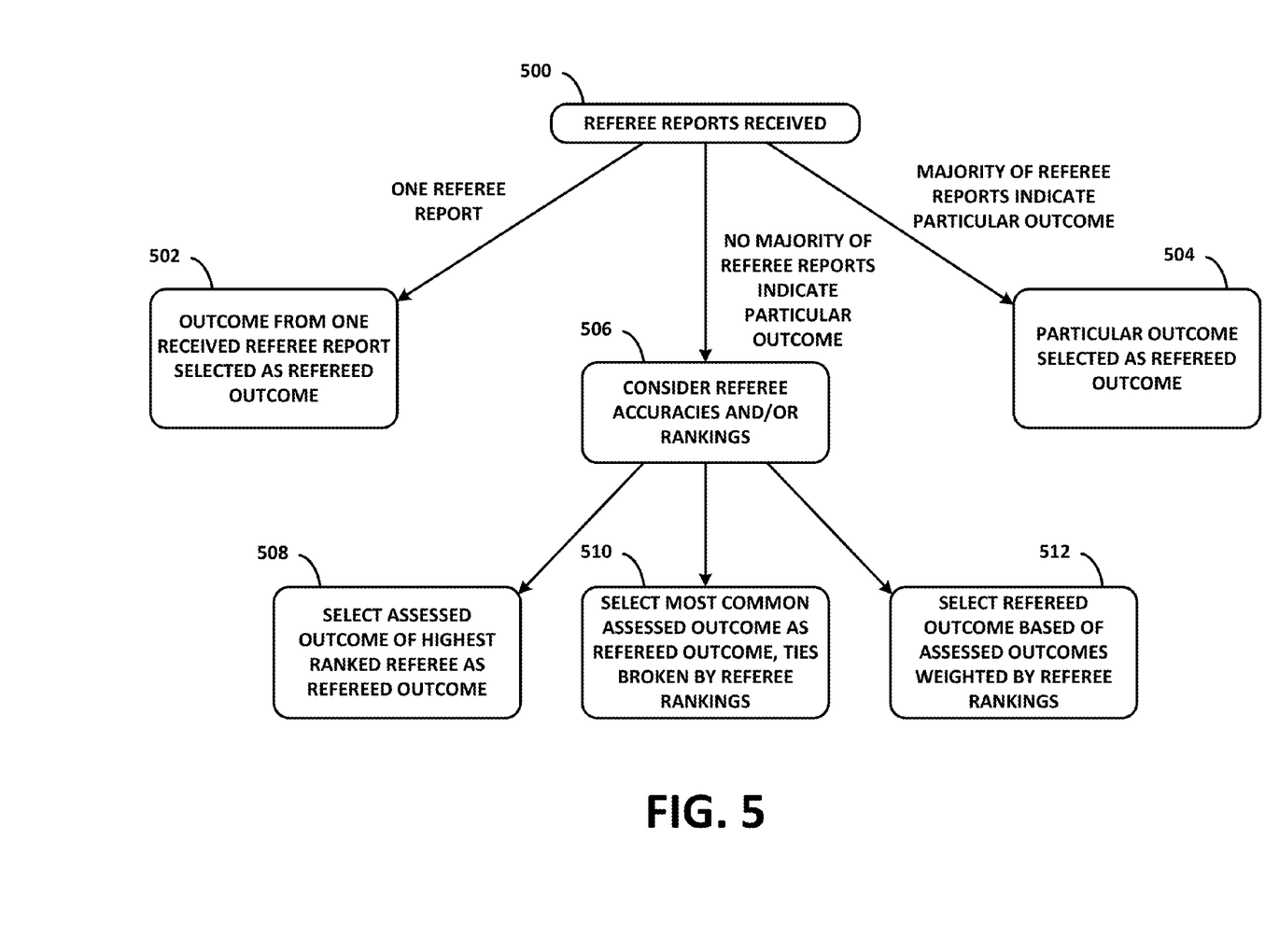
FIG. 5 is a decision tree, according to an example embodiment.

FIG. 5 is a decision tree illustrating possible voting protocols for refereed assessments of plays. One or more referees may provide respective assessments for a particular completed play of the real-world game. In some cases, a large number of referees (e.g., 10 or more) may be used in order to potentially improve the quality of these assessments. When the referee assessments do not agree, one or more of the mechanisms described herein may be used to determine a refereed outcome of the play.

At block 500, one or more referee reports may be received by the fantasy gaming server. If there is only one referee report, then at block 502, the outcome indicated by that referee report may be used as the refereed outcome of the play.

On the other hand, if there are two or more referee reports, and the majority of these reports indicate a particular outcome (i.e., the same outcome), then at block 504, the particular outcome may be selected as the refereed outcome. For example, if there are five referee reports received and at least three of these referee reports indicate the same outcome, that outcome may be selected as the refereed outcome. In some embodiments the majority may be a simple majority (i.e., greater than 50%), while in other embodiments, a supermajority of at least 60%, 66%, 75%, etc. may be required.

If there are two or more referee reports, but no majority of these reports indicate a particular outcome, then at block 506, referee accuracies and/or rankings may be considered when determining the refereed outcome. Blocks 508, 510, and 512 provide three example ways in which referee rankings may be considered.

In block 508, the assessed outcome of the highest ranked referee may be selected as the refereed outcome. For instance, suppose that there are six referee reports, and three particular assessments of the play have been indicated by two referees each. Then, out of the six reporting referees, the assessment of the highest ranked referee (e.g., the referee with the highest accuracy) may be selected as the refereed outcome.

In block 510, the most common assessed outcome may be selected as the refereed outcome. In this embodiment, the assessed outcome that is indicated by a plurality of the referee reports is selected. If there is more than one plurality, then referee rankings may be considered to break the tie. For instance, suppose that there are five referee reports, with two referees indicating a first outcome, two other referees indicating a second outcome, and one referee indicating a third outcome. Then, of the referees contributing to the first and second outcomes, the assessment of the highest ranked referee may be selected as the refereed outcome.

In block 512, the refereed outcome may be selected based on the assessments of the referees, weighted by the rankings of those referees. In one example, for a group of referees that have indicated the same assessment of the play, their respective referee rankings may be summed. A similar operation may be performed for other groups of referees that agree with each other. The assessment of the group with the highest summed referee rankings may be selected.

For example, suppose that referee reports are received from referees A, B, C, and D. Referees A and B have assessed a first outcome for the play, while referees C and D have assessed a second outcome for the play. Referee A has a referee ranking of 94.1% (0.941), referee B has a referee ranking of 95.7% (0.957), referee C has a referee ranking of 98.9% (0.989), and referee D has a referee ranking of 96.2% (0.962). The assessment of referees A and B has a weight of 1.898, while the assessment of referees C and D has a weight of 1.951. Therefore, the assessment of referees C and D may be selected as the refereed outcome.

FIG. 5 illustrates example embodiments, but other embodiments are possible. For instance, any of the disclosed embodiments may be combined with one another in any fashion. In some cases, only referee assessments from referees with at least a particular referee ranking may be considered in the voting protocol FIG. 5. For example, of all referee reports received at block 500, only those from referees with a referee ranking of at least 75%, 80%, 85%, 90%, etc., may be considered in the voting protocol. Further, as noted above, one referee may be designated as head referee. In any variation of the voting protocol, the head referee may have the ability to break ties or otherwise determine the refereed outcome of a play when there is no clear majority.

6. Example Operations

Figure 6:
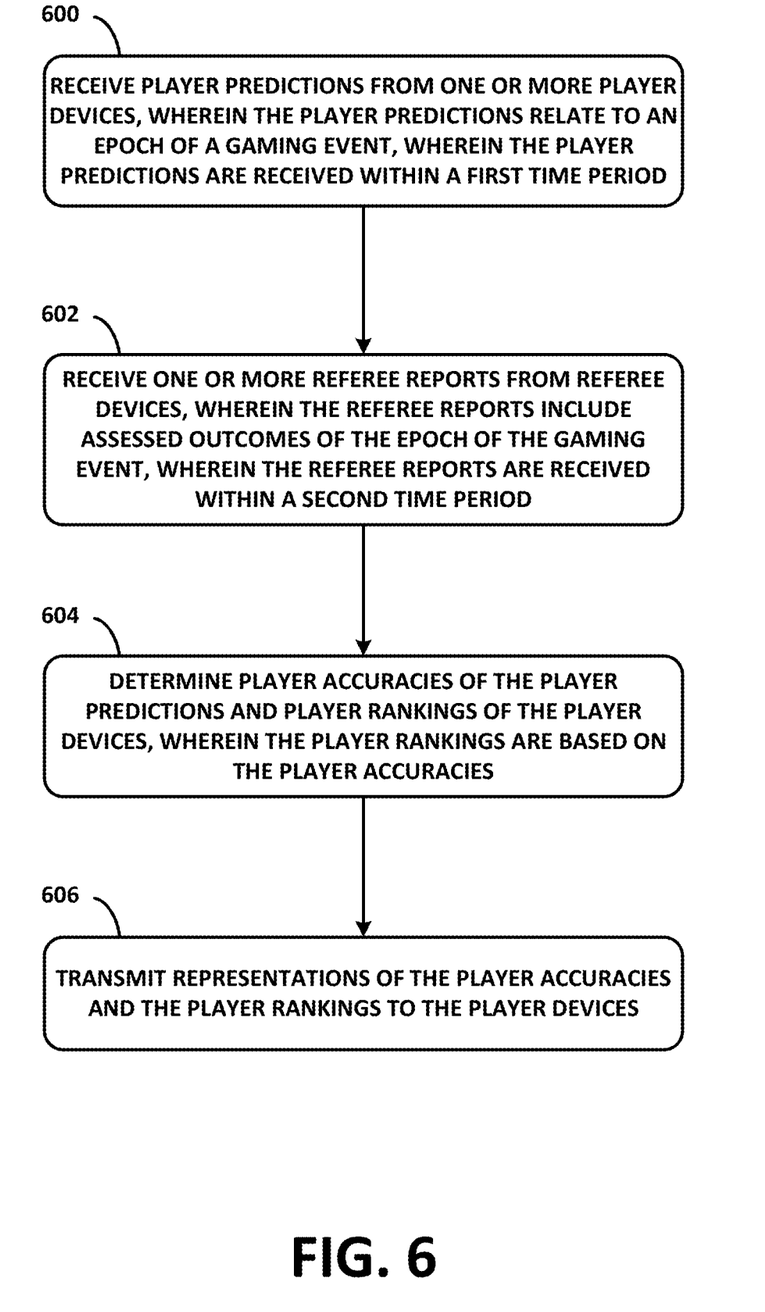
FIG. 6 is a flow chart, according to an example embodiment.

FIG. 6 is a flow chart illustrating an example embodiment. The process illustrated by FIG. 6 may be carried out by a computing device, such as computing device 200, and/or a cluster of computing devices, such as server cluster 304. However, the process can be carried out by other types of devices or device subsystems. For example, the process could be carried out by a portable computer, such as a laptop or a tablet device. Further, process may be combined with one or more features disclosed in the context of any previous figure.

At block 600, player predictions may be received from one or more player devices. The player predictions may relate to an epoch of a contemporaneously-occurring, real-time gaming event (e.g., of a real-world game). The player predictions may be received within a first pre-defined time period. In some embodiments, at least one of the received player predictions may be a preset prediction configured at a player device.

At block 602, possibly after receiving the player predictions, one or more referee reports may be received from referee devices. The referee reports may include assessed outcomes of the epoch of the contemporaneously-occurring, real-time gaming event. The referee reports may be received within a second pre-defined time period.

In some embodiments, the first and second pre-defined time periods may overlap to some extent. Further, the first time period may be anywhere from 0 to 20 seconds in length (e.g., 10, 12, or 15 seconds), and the second time period may be anywhere from 0 to 15 seconds in length (e.g., 3, 4, or 6 seconds). Nonetheless, the first and second time periods may take on values outside of these ranges.

The refereed reports may be from human or automated sources. Thus, in some cases, at least one referee report from received from a human referee. Alternatively or additionally, at least one of the referee reports may be from a commercial real-time or near-real-time statistics feeder for the contemporaneously-occurring, real-time gaming event.

At block 604, possibly based on the player predictions and the referee reports, player accuracies of the player predictions and player rankings of the player devices may be determined. The player rankings may be based on the player accuracies. At block 606, representations of the player accuracies and the player rankings may be transmitted to the player devices.

In some embodiments, determining player accuracies of the player predictions may involve determining a refereed outcome of the epoch of the contemporaneously-occurring, real-time gaming event based on the referee reports. Then, the player accuracies may be determined based on how closely the player predictions match the refereed outcome.

In some situations, exactly one referee report may be received, and the refereed outcome may be the assessed outcome of the exactly one referee report. Alternatively, multiple referee reports may be received. If a majority of the assessed outcomes of the referee reports indicate a particular outcome, then the refereed outcome of the epoch of the contemporaneously-occurring, real-time gaming event may be selected to be the particular outcome.

In another alternative, multiple referee reports may be received. Each of the referee reports may be associated with respective referee ratings. If no majority of the assessed outcomes of the referee reports indicates a particular outcome, then the refereed outcome of the epoch of the contemporaneously-occurring, real-time gaming event may be selected as a particular assessed outcome of a particular referee report that is associated with a highest referee rating of the referee ratings.

In certain scenarios, one or more late referee reports for the epoch of the contemporaneously-occurring, real-time gaming event may be received outside of the second pre-defined time period. The refereed outcome of the epoch of the contemporaneously-occurring, real-time gaming event might not be based on the late referee reports. In other words, the late referee reports may be ignored when determining the refereed outcome.

In some embodiments, possibly based on the predictions and the referee reports, referee accuracies of the referee reports may be evaluated. Referee rankings may be updated based on the evaluated referee accuracies of the referee reports. Representations of the referee accuracies of the referee reports and the referee rankings may be transmitted to the referee devices. The referee rankings may also be based on the timeliness of the referee reports. A particular referee report may be considered timely if it is received within the second pre-defined time period.

Additionally, in some implementations, a particular referee device may be a designated head referee device. A message may be received from the head referee device, indicating that the epoch of a contemporaneously-occurring, real-time gaming event was abnormal. Possibly based on the message, all player accuracies and player rankings may be reset to their values prior to commencement of the epoch of a contemporaneously-occurring, real-time gaming event.

As noted above, the contemporaneously-occurring, real-time gaming event may be any sporting event, gaming event, or contest. Thus, in some cases, the epoch of the contemporaneously-occurring, real-time gaming event is a play of an American football game, an at-bat of a baseball game, or an event of a video game.

In some cases, representations of historical epochs of the gaming event may be transmitted to player devices. These historical epochs may be associated with the epoch of the contemporaneously-occurring, real-time gaming event. For example, if the real-world game is in a particular state, the fantasy gaming server provide at least some players with plays and/or play outcomes that are have occurred in previous epochs of the real-world game when it was in the same or a similar state.

For instance, in the case of American football, if the offensive team is in possession of the football in a particular field position, the television broadcast of the real-world game might display the one or more examples of what the team has done in the past when they were in this position. Alternatively or additionally, once the play begins television broadcast of the real-world game might display the predicted outcomes of at least some players of the fantasy game.

7. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A method comprising:

receiving, by a processor of a server device, player predictions from one or more player devices via a wide-area network, wherein the player predictions relate to an outcome of a particular play of a real-time game of American football, and wherein the player predictions are received within a first time period defined as between when a sequentially-previous play of the game ends and when the particular play of the game begins;

after receiving the player predictions, receiving, by the processor of the server device via the wide-area network, one or more referee reports from referee devices, wherein the referee reports include assessed outcomes of the particular play, and wherein the referee reports are received within a second time period defined as between when the particular play of the game ends and when a sequentially-following play of the game begins;

based on the player predictions and the referee reports, determining, by the processor of the server device, player accuracies of the player predictions and player rankings of the player devices, wherein the player rankings are based on the player accuracies; and transmitting, by the processor of the server device via the wide-area network, representations of the player accuracies and the player rankings to the player devices, wherein reception of the transmitted representations cause the respective player devices to display, on respective graphical user interfaces of the player devices, at least some of the player accuracies and player rankings, and wherein the player devices display the transmitted representations before the sequentially-following play of the game begins.

2. The method of claim 1, wherein determining player accuracies of the player predictions comprises:

based on the referee reports, determining a refereed outcome of the particular play; and determining the player accuracies based on how closely the player predictions match the refereed outcome.

3. The method of claim 2, wherein exactly one referee report is received, and wherein the refereed outcome is the assessed outcome of the exactly one referee report.

4. The method of claim 2, wherein multiple referee reports are received, and wherein determining the refereed outcome of the particular play comprises:

determining that a majority of the assessed outcomes of the referee reports indicate a particular outcome; and selecting, as the refereed outcome of the particular play, the particular outcome.

5. The method of claim 2, wherein multiple referee reports are received, wherein the referee reports are associated with referee ratings, and wherein determining the refereed outcome of the particular play comprises:

determining that no majority of the assessed outcomes of the referee reports indicate a particular outcome; and selecting, as the refereed outcome of the particular play, a particular assessed outcome of a particular referee report that is associated with a highest referee rating of the referee ratings.

6. The method of claim 2, wherein one or more late referee reports for the particular play are received outside of the second time period, and wherein the refereed outcome of the particular play is not based on the late referee reports.

7. The method of claim 1, further comprising:

based on the predictions and the referee reports, evaluating referee accuracies of the referee reports;

updating referee rankings based on the evaluated referee accuracies of the referee reports; and transmitting representations of the referee accuracies of the referee reports and the referee rankings to the referee devices.

8. The method of claim 7, wherein the referee rankings are also based on the timeliness of the referee reports, wherein a particular referee report is considered timely when it is received within the second time period.

9. The method of claim 1, wherein at least one of the referee reports is from a commercial real-time or near-real-time statistics feeder for the game.

10. The method of claim 1, wherein a particular referee device is a designated head referee device, the method further comprising:

receiving a message from the head referee device, wherein the message indicates that the particular play was abnormal; and based on the message, resetting all player accuracies and player rankings to their values prior to commencement of the particular play.

11. The method of claim 1, wherein at least one of the received player predictions is a preset prediction configured at a player device.

12. The method of claim 1, wherein the first time period is between 0 and 20 seconds in length, and the second time period is between 0 to 15 seconds in length.

13. The method of claim 1, further comprising:

transmitting, to the player devices, representations of previously occurring plays of the game.

14. An article of manufacture including a non-transitory computer-readable medium, having stored thereon program instructions that, upon execution by a server device, cause the server device to perform operations comprising:

receiving player predictions from one or more player devices via a wide-area network, wherein the player predictions relate to an outcome of a particular play of a real-time game of American football, and wherein the player predictions are received within a first time period defined as between when a sequentially-previous play of the game ends and when the particular play of the game begins;

after receiving the player predictions, receiving one or more referee reports from referee devices via the wide-area network, wherein the referee reports include assessed outcomes of the particular play, and wherein the referee reports are received within a second time period defined as between when the particular play of the game ends and when a sequentially-following play of the game begins;

based on the player predictions and the referee reports, determining player accuracies of the player predictions and player rankings of the player devices, wherein the player rankings are based on the player accuracies; and transmitting, via the wide-area network, representations of the player accuracies and the player rankings to the player devices, wherein reception of the transmitted representations cause the respective player devices to display, on respective graphical user interfaces of the player devices, at least some of the player accuracies and player rankings, and wherein the player devices display the transmitted representations before the sequentially-following play of the game begins.

15. The article of manufacture of claim 14, wherein determining player accuracies of the player predictions comprises:

based on the referee reports, determining a refereed outcome of the particular play; and determining the player accuracies based on how closely the player predictions match the refereed outcome.

16. The article of manufacture of claim 15, wherein exactly one referee report is received, and wherein the refereed outcome is the assessed outcome of the exactly one referee report.

17. The article of manufacture of claim 15, wherein multiple referee reports are received, and wherein determining the refereed outcome of the particular play comprises:

determining that a majority of the assessed outcomes of the referee reports indicate a particular outcome; and selecting, as the refereed outcome of the particular play, the particular outcome.

18. The article of manufacture of claim 14, the operations further comprising:

based on the predictions and the referee reports, evaluating referee accuracies of the referee reports;

updating referee rankings based on the evaluated referee accuracies of the referee reports; and transmitting representations of the referee accuracies of the referee reports and referee rankings to the referee devices.

19. A server device comprising:

at least one processor;

data storage; and program instructions, stored in the data storage, that upon execution by the at least one processor cause the server device to perform operations including:

receiving player predictions from one or more player devices via a wide-area network, wherein the player predictions relate to an outcome of a particular play of a real-time game of American football, and wherein the player predictions are received within a first time period defined as between when a sequentially-previous play of the game ends and when the particular play of the game begins;

after receiving the player predictions, receiving one or more referee reports from referee devices via the wide-area network, wherein the referee reports include assessed outcomes of the particular play, and wherein the referee reports are received within a second time period defined as between when the particular play of the game ends and when a sequentially-following play of the game begins;

based on the player predictions and the referee reports, determining player accuracies of the player predictions and player rankings of the player devices, wherein the player rankings are based on the player accuracies; and transmitting, via the wide-area network, representations of the player accuracies and the player rankings to the player devices, wherein reception of the transmitted representations cause the respective player devices to display, on respective graphical user interfaces of the player devices, at least some of the player accuracies and player rankings, and wherein the player devices display the transmitted representations before the sequentially-following play of the game begins.

* * * * *